July 30, 1940.    F. THORNTON, JR    2,209,668
DEVICE FOR VIEWING TRANSPARENCIES
Filed July 28, 1938    4 Sheets-Sheet 2
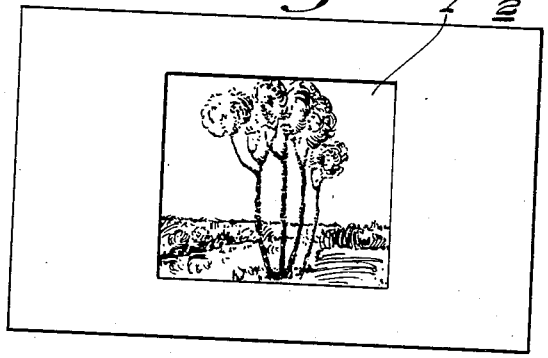
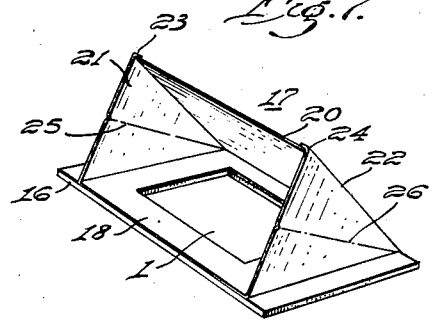
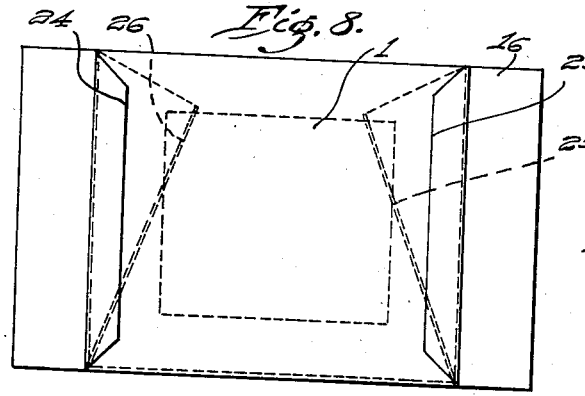
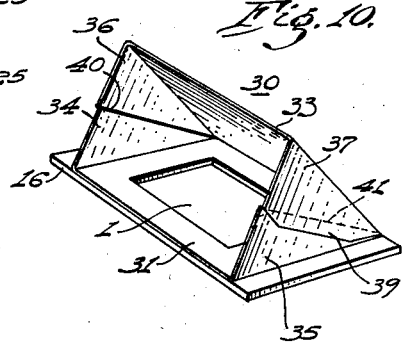
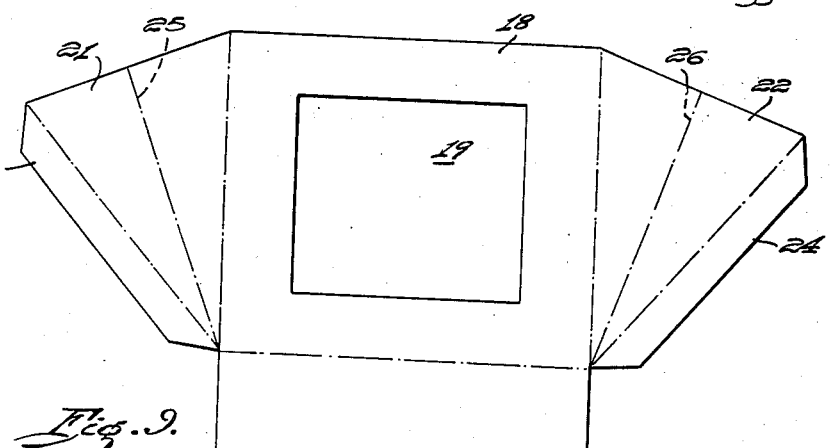
WITNESSES:
INVENTOR
Frank Thornton Jr.
BY
William R. Coley
ATTORNEY July 30, 1940. F. THORNTON, JR 2,209,668
DEVICE FOR VIEWING TRANSPARENCIES
Filed July 28, 1938 4 Sheets-Sheet 3
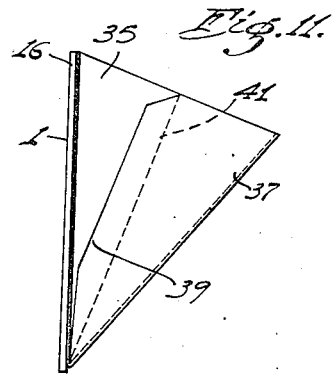
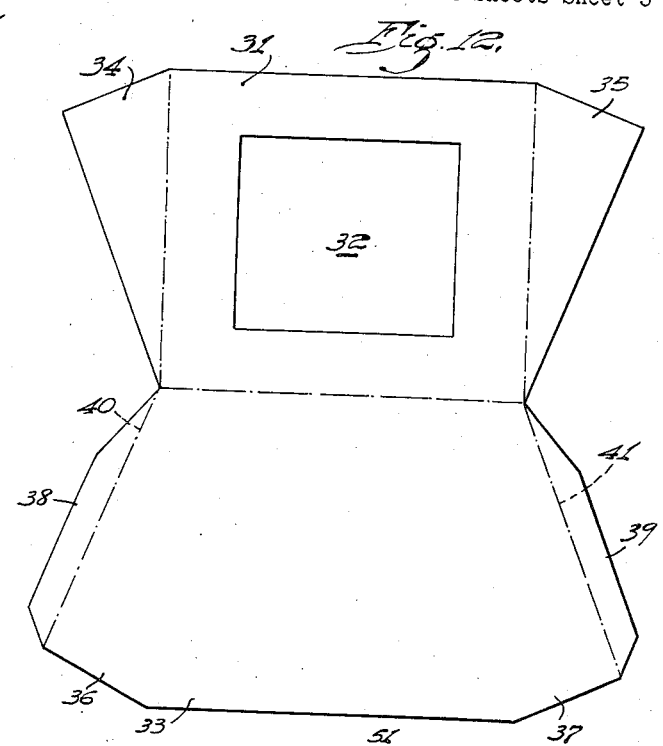
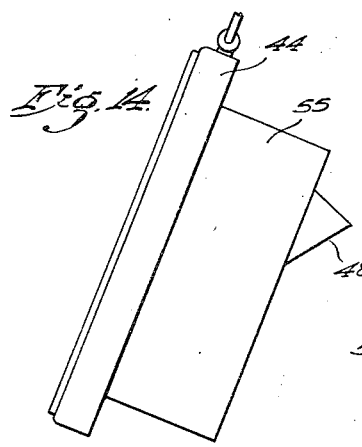
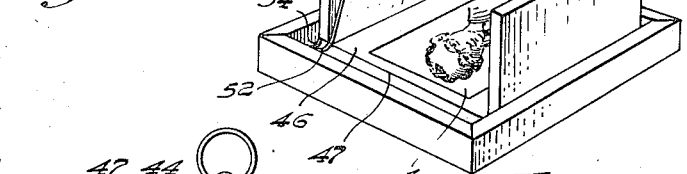
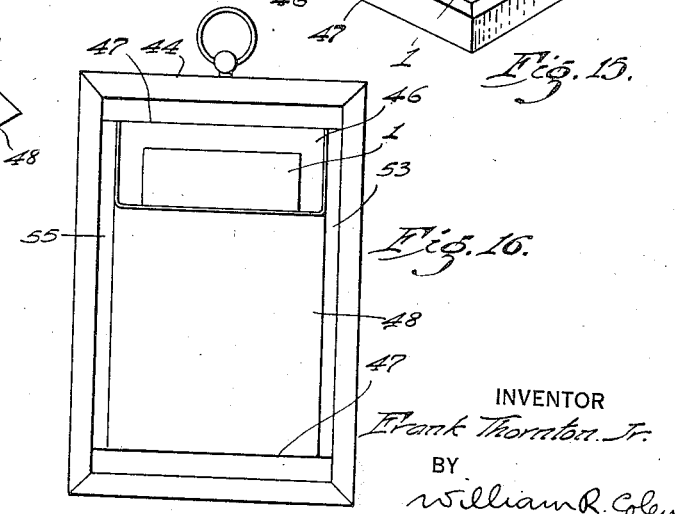
WITNESSES:
INVENTOR
Frank Thornton Jr.
BY
William R. Coley
ATTORNEY July 30, 1940.     F. THORNTON, JR     2,209,668
DEVICE FOR VIEWING TRANSPARENCIES
Filed July 28, 1938     4 Sheets—Sheet 4
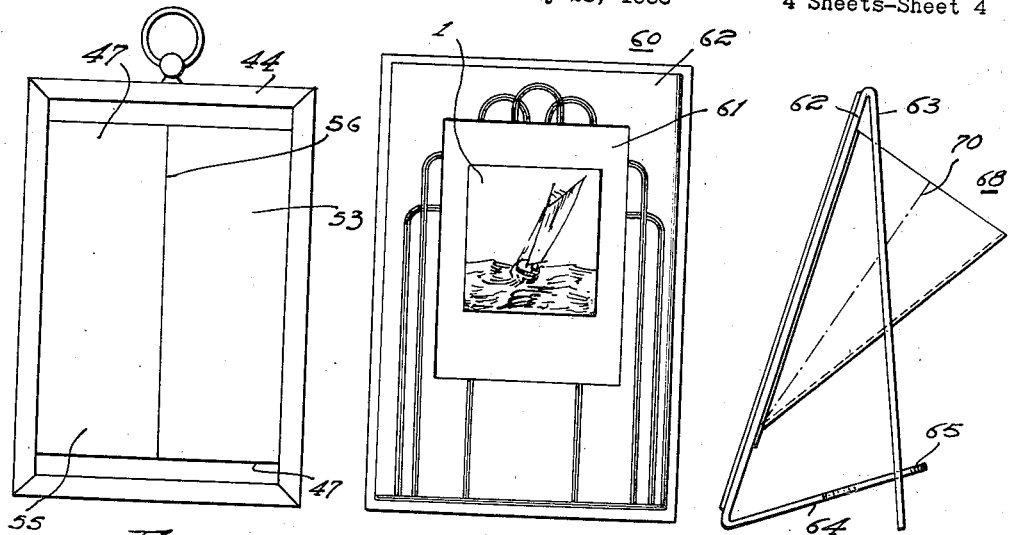
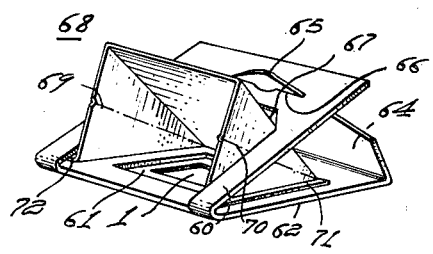
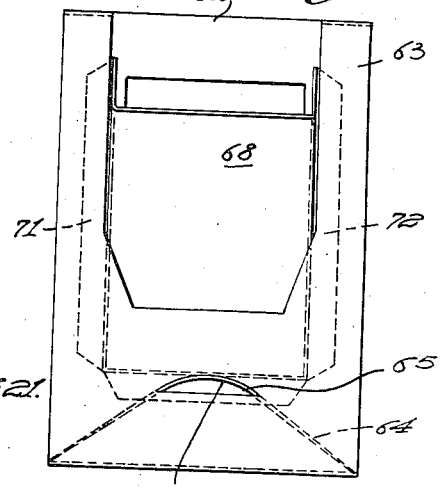
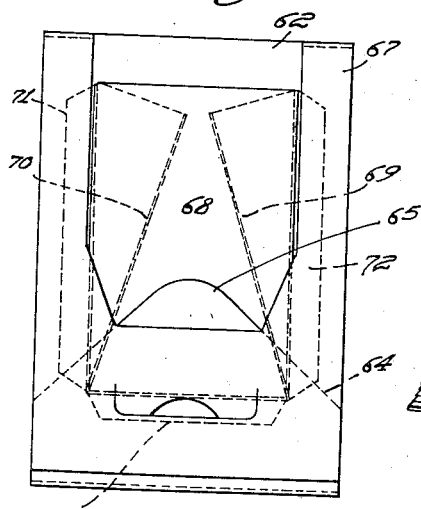
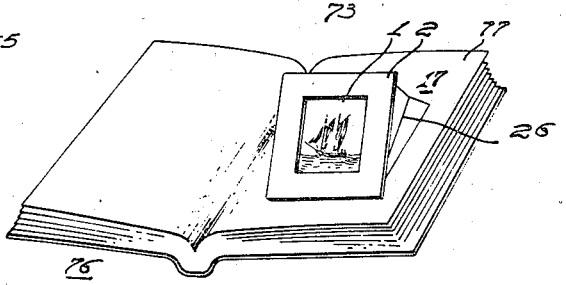
INVENTOR
Frank Thornton Jr.
BY William R. Coley
ATTORNEY Patented July 30, 1940

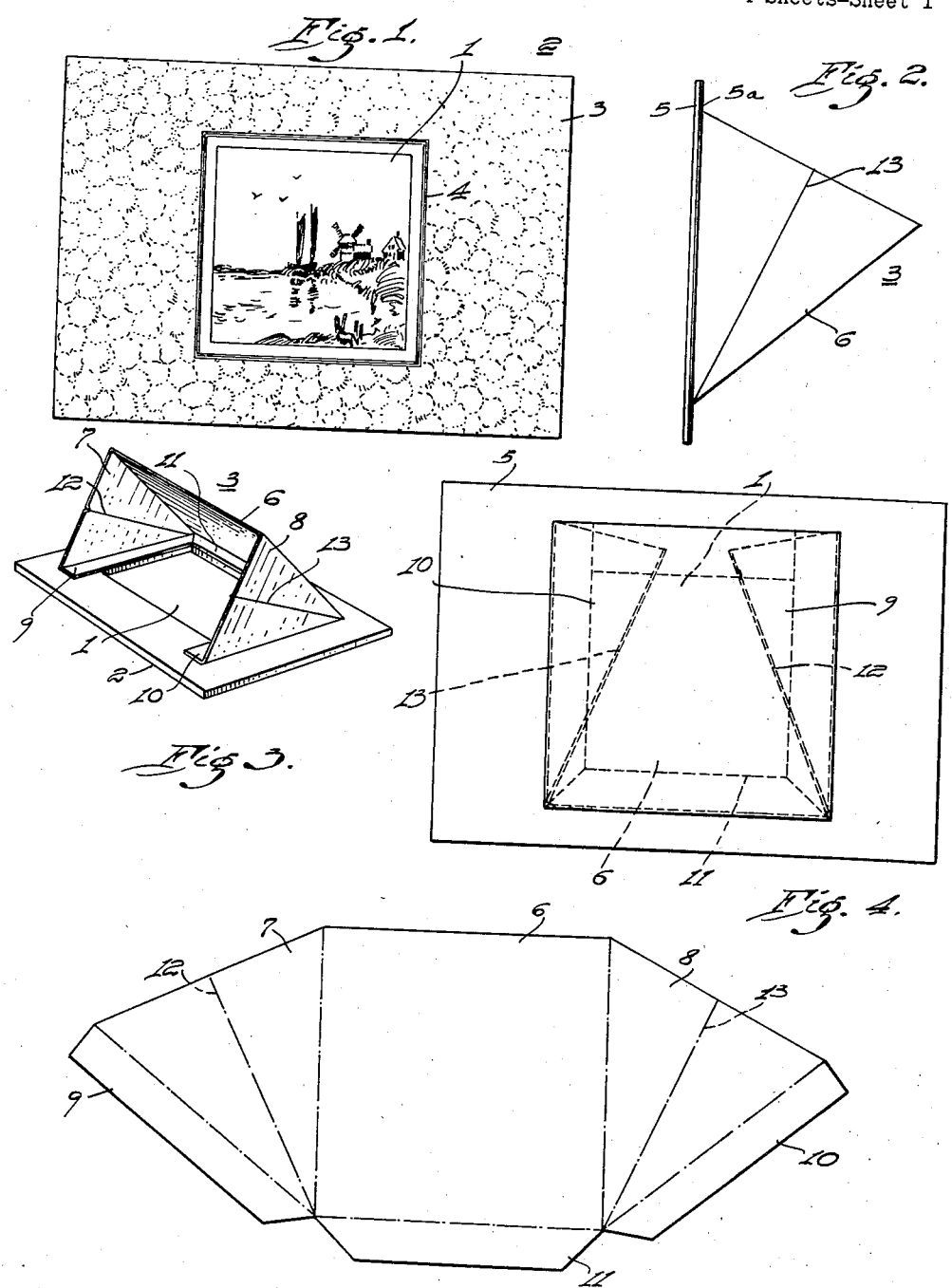

2,209,668

UNITED STATES PATENT OFFICE 2,209,668

DEVICE FOR VIEWING TRANSPARENCIES

Frank Thornton, Jr., Pittsburgh, Pa.

Application July 28, 1938, Serial No. 221,865

6 Claims. (Cl. 40—159)

My invention relates to transparencies, and it has particular relation to the convenient viewing thereof.

Sources of light that are usually available are seldom satisfactory when a transparency is held before them for viewing because the outline of the light source is visible through the transparency. One object of this invention, therefore, is to provide a uniformly illuminated light source properly located behind the transparency so as to give as near to the natural illumination of the picture as possible.

In the prior art, it has been necessary in viewing transparencies to hold the same up to or against a light source, usually overhead, so that the viewing of a considerable number of such transparencies was both inconvenient and tiring. A further object of my invention, therefore, is to provide a relatively simple, convenient and inexpensive but fully effective structure for permitting a full view of a transparency while held or located in position for natural viewing, that is, in accordance with a downward line of vision.

Another object of my invention is to provide a generally wedge-shaped light-responding structure disposed to the rear of the transparency and having the top side open for admitting light, such light-responding structure being self-supporting and its ends collapsible, preferably foldable along a median line, whereby the full effect of the transparency may be readily obtained by holding it in a normal position below the eyes, and when it is desired to put the transparency away, such light-responding structure may be folded to lie flat, thus permitting satisfactory packing or stacking.

A further object of my invention is to provide a light-responding structure of the type set forth composed of a relatively stiff fibrous material, such as heavy paper, capable of standing repeated folding and unfolding for the purposes set forth.

Another object of my invention is to provide a light-responding structure of the type in question constituting a single member of such fibrous material.

Other objects of my invention will become evident from the following detailed description, taken in conjunction with the accompanying drawings wherein:

Figure 1 is a view in front elevation and Fig. 2 a view in side elevation of one form of my invention;

Fig. 3 is a perspective view, taken from above, of the structure shown in Figs. 1 and 2;

Fig. 4 is a view in rear elevation of the structure, with the parts flattened against each other;

Fig. 5 is a developed view or pattern of the wedge-shaped light-responding structure shown in Figs. 2 and 3;

Fig. 6 is a view in front elevation of a modified form of my invention;

Figs. 7, 8 and 9 are views corresponding to Figs. 3, 4 and 5 of the first form of my invention;

Fig. 10 is a perspective view of a third form of my invention, Fig. 11 being a view in side elevation of the complete device and Fig. 12 a pattern of the light-responding structure employed therein;

Fig. 13 is a view in front elevation of a fourth form of the device embodying my invention, Fig. 14 being a view in side elevation and Fig. 15 a perspective view thereof;

Fig. 16 is a view in rear elevation of the structure shown in Figs. 14 and 15, the light-responding structure being in its open position;

Fig. 17 is a view in rear elevation of the device shown in Figs. 14 and 15, with the parts flattened against each other;

Fig. 18 is a view in front elevation of another form of my invention, Fig. 19 being a view in side elevation thereof and Fig. 20 a perspective view thereof;

Fig. 21 and Fig. 22 are views in rear elevation corresponding to the open and closed condition of the device shown in Figs. 19 and 20; and Fig. 23 is a view of a further form of my invention adapted to be combined with a picture album.

Referring to Figs. 1 to 5, inclusive, the structure there shown comprises a suitable transparency 1 associated with a suitable mounting structure 2 and provided with my light-responsive structure 3, which is generally wedge-shaped with an open side at the top to admit light, and the rear face acting to reflect or transmit light forwardly to the transparency 1.

The mounting structure 2 may be of any well known type, being here shown as comprising a front and a rear sheet 5 and 5a, respectively, which are preferably held together by rubber cement and are provided with a substantially square central opening for receiving the transparency 1, the edges of which are held between the two sheets 5 and 5a by such cement. If desired, an ornamental rectangle 4 constituting lines or indentations may be provided around the central opening.

The light-responding structure 3 is made from a sheet of the form shown in Fig. 5 which embodies a relatively square rear surface 6 which is located opposite the transparency 1, two triangular side portions 7 and 8 respectively provided with flaps or tabs 9 and 10, a further flap 11 being provided at the bottom of the rear portion 6, and the triangular side members 7 and 8 being collapsible or foldable along median lines 12 and 13, respectively, these lines intersecting the apex of the wedge, as is clearly shown in Figs. 2 and 3.

The light-responding structure 3 is assembled on the mounting structure 2, as clearly shown in Fig. 3, having the flaps 9, 10 and 11 held in place, preferably by rubber cement, around the transparency 1. It will be noted that the front side or the side of the light-responding structure next to the transparency is partially open in order not to obstruct the transmission of light to the rear side of the transparency, it being understood that various other means may be provided for affixing the light-responding structure to the mounting structure, as shown, for example, in succeeding figures.

I have used the term "light-responding" as applicable to structure 3, inasmuch as the material preferably employed therein is translucent, so that light from above may pass through the open top face and be reflected from the front side of surface 6 toward the transparency or transmitted directly through the face 6 from a light source in the rear thereof.

One of the preferred materials for the light-responding structure is a relatively stiff paper, such as Hercules ledger (32 lbs. per ream) having a matte surface. The material may also comprise a cloth-lined cover paper. A light-responding structure 3 made from these and similar papers will not only provide good light reflection or transmission, but will also stand repeated bending along the median lines 12 and 13, and may readily be flipped into open position.

I desire it to be understood that opaque paper could also be employed insofar as light-reflecting purposes are concerned, but this would not be as convenient in assembling the parts as a translucent paper, since the device, when being assembled, may be held over an electric lamp or its reflection in a mirror and the parts may be thus readily alined and properly assembled.

When it is desired to view the transparency 1, the light-responding structure 3 is opened out into its position shown in Figs. 2 and 3, which may be readily done with the fingers of one hand, and the entire device is then held in a normal position below the eyes for easy and convenient viewing. The light transmitted from the rear surface 6 brings out the full beauty and scope of the picture with no shadows or other undesirable features, so that a considerable number of transparencies may thus be readily viewed and properly enjoyed without the viewing becoming inconvenient or tiresome, as has been the case in holding transparencies over one's head in order to view them against a light.

It will also be appreciated that, on account of the relatively stiff paper that is used in the light-responding structure, the device may be properly viewed when laid on its back, as the structure 3 is self-sustaining or self-supporting and will likewise readily support the weight of the transparency and its mounting.

When it is desired to stack or pack the device, it is merely necessary to fold the triangular ends of the structure 3 preferably inwardly, as shown in Fig. 4, whereupon the structure 3 may be flattened against the mounting 2 and the device may thus be readily stacked or packed.

Figs. 6 to 9, inclusive, show a different type of light-responding structure 17, comprising a front face 18 having an internal aperture 19 to be located opposite the transparency 1, a rear light-reflecting surface 20, and triangular side members 21 and 22 provided with flaps 23 and 24, respectively, and also with folds 25 and 26 along their median lines.

The light-responding structure 17 is assembled as shown in Fig. 7 with the apertured front portion 18 affixed preferably with rubber cement to the single mounting structure or plate 16, the flaps 23 and 24 being secured over the edges of the rear sheet 20, whereby a wedge-shaped light-responding structure similar to that shown in the preceding figures is provided, being again foldable along the median lines 25 and 26 (to lie flat, as shown in Fig. 8) and being made of one piece of material and requiring only a single sheet 16 for the mounting structure, as the inner edges of front sheet 18 of the light-responding structure 17 may be employed for holding down the edges of the transparency 1.

Figs. 10, 11 and 12 show a third form of light-responding structure 30 embodying a front face 31 having an aperture 32 and a rear face 33, the front face 31 being provided with half portions 34 and 35 of the triangular sides of the device and the rear sheet 33 being likewise provided with the complementary half portions 36 and 37, together with flaps 38 and 39. The lines designated as 40 and 41 constitute the median lines along which the triangular sides may be folded, such lines 40 and 41 coinciding with the edges of the partial side portions 34 and 35 on the front face 31, as will be evident from a study of Figs. 10 and 11.

Here again, a single mounting sheet 16 may be employed, the edges of front face 31 being employed to hold the transparency 1 in position and permit the proper light-reflecting action. When the parts are assembled into the wedge-shaped structure shown in Fig. 10, the flaps 38 and 39 are affixed in position, preferably with rubber cement, and the same light-responding action is provided as in the case of the previously described two forms. In this case, the folds occur along the median lines 40 and 41 which do not interfere with the flaps, since the latter constitute parts that extend beyond such median lines.

It will be noted that the pattern shown in Fig. 12 will be more economical of paper when a number are made than the pattern shown in Fig. 9, the final results being the same in both cases.

In Figs. 13 to 17, inclusive, a further form of my invention is shown comprising a metal frame 44 and a mounting for the transparency 1, which mounting may comprise a front sheet or mat 45, a rear sheet 46 and a relatively thick cardboard border or frame 47 for a purpose to be described.

The light-responding structure is preferably of a simple form comprising a rear light-reflecting surface 48, sides 49 and 50 being foldable along lines such as 51 and being provided with suitable flaps or tabs 52 that extend outwardly away from the transparency 1.

In addition, in this form of my invention, I provide side members or doors 53 and 55, located outside of the light-responding structure, which may be held in position by suitable flexible hinges 54 near the outer edges of the apparatus. The members 53 and 55 are preferably of the same thickness and cut from the same material as border 47.

When the device is in its open position, as shown in Figs. 14, 15 and 16, for example, the device may be stood up in a rearwardly tilted position by reason of the provision of the side members 53 and 55, and the desired convenient viewing of the transparency may thus be effected without it being required to hold the transparency in one's hands.

However, when it is desired to stack or pack the device, the light-responding structure may be folded along the lines 51, thus being flattened against the transparency and its mounting, and the side members 53 and 55 may then be folded together, meeting at a central line 56, as shown in Fig. 17. The side members 53 and 55, being preferably of substantially the same thickness as the border parts 47 and of the same size as the aperture in the border, substantially fully occupy the space within the border between the transparency and its mounting and the frame or, in other words, a relatively smooth rear surface is provided, when the device occupies its closed position, as shown in Fig. 17.

In the form of my invention shown in Figs. 18 to 22, inclusive, I have provided my light-responding structure 68 in conjunction with an easel type of frame 60 which may comprise a front mat or mounting 61 around the transparency 1, an outer mat or mounting 62 which is folded at the top and bottom to provide an apertured sheet 63 having a slit 66 therein near the bottom and a lower sheet 64 having a tongue 65 thereon. On account of the provision of a large aperture 67 extending downwardly from the top of the rear member 63, the light-responding structure 68 may occupy its normal open position without interfering with the part 63, and at the same time, by inserting the tongue 65 through the slit 66, the device may occupy its usual rearwardly tilted position on a table, for example, as illustrated in Fig. 19. In this way, the transparency 1 may be readily viewed again without requiring it being held in the hand.

The light-responding structure 68 is provided with the median folding lines 69 and 70, so that, when desired for packing or stacking, the light-responding structure may be flattened against the transparency and its mounting, as indicated in Fig. 22, and the rear supports 63 and 64 may be disengaged and also folded inwardly to occupy a flattened position, as likewise indicated in Fig. 22.

The application of my invention to a picture album is illustrated in Fig. 23, which shows any suitable album 66 with a transparency 1 mounted on a structure 2, for example, and backed by a light-responding structure, such as 17 of Fig. 7, the rear face of which is affixed by rubber cement, for example, to the corresponding page 77 of the album.

As the pages of the album are turned over, the transparency may be readily flipped to the position shown in Fig. 23, which permits a ready and enjoyable viewing of the transparency, and then, as the page is turned over, the sides of the light-responding structure may be folded inwardly so that the pages and their contents will lie relatively flat throughout the book.

It will be seen, therefore, that I have provided a relatively simple and inexpensive one-piece light-responding structure which is adapted to be employed in various forms for the convenient and enjoyable showing of transparencies.

I do not wish to be restricted to the specific structural details or arrangement of parts shown in the drawings, as various further modifications may be effected without departing from the spirit and scope of my invention. I desire, therefore, that only such limitations shall be imposed thereon as are indicated in the appended claims.

I claim as my invention:

1. The combination with a transparency and a mounting structure therefor, of a generally wedge-shaped light-responding structure disposed on said mounting structure opposite the transparency, said light-responding structure having the side next to the transparency at least partially open to permit unobstructed light to pass from the opposite side to the transparency, and also having an adjacent side open for admitting light, said light-responding structure being composed of translucent material thereby to permit viewing of said transparency either by light admitted through said open side and reflected from said opposite side or by light passing through said opposite side.

2. The combination with a transparency and a mounting structure therefor, of a generally wedge-shaped light-responding structure disposed on said mounting structure opposite the transparency, said light-responding structure having the side next to the transparency at least partially open to permit unobstructed light to pass from the opposite side to the transparency, and also having an adjacent side open for admitting light, said light-responding structure constituting a single member of translucent fibrous material thereby to permit viewing of said transparency either by light admitted through said open side and reflected from said opposite side or by light passing through said opposite side.

3. A background structure adapted to be attached to a transparency mount, comprising a sheet having a substantially rectangular central portion, an attaching portion at one side thereof and substantially triangular extensions at its ends with medial fold lines, said central portion having a light-diffusing and reflecting surface.

4. A background structure adapted to be attached to a transparency mount, comprising a sheet having a substantially rectangular central portion, an attaching portion at one side thereof, substantially triangular extensions at its ends with medial fold lines, and attaching flaps at the outer edges adjacent to said attaching portion, said central portion having a light-diffusing and reflecting surface.

5. A background structure having foldable substantially triangular end walls adapted to be attached to the back of a transparency mount, the side adjacent said transparency being open and the side opposite said transparency being disposed between and attached to both end walls and having a light-diffusing and reflecting surface, said end walls and opposite side folding flat against the mount when not in use, and said surface diffusing and reflecting light opposite the transparency when the background is opened by straightening out said end walls.

6. A background structure having medially foldable substantially triangular end walls adapted to be attached to the back of a transparency mount, the side opposite said transparency being substantially rectangular in shape and having its opposite sides attached to the respective end walls and also having a light-diffusing and reflecting surface, said end walls and opposite side folding flat against the mount when not in use, and said surface diffusing and reflecting light opposite the transparency when the background is opened by straightening out said end walls.

FRANK THORNTON, Jr.